(12) United States Patent
Bellato et al.

(10) Patent No.: US 7,720,111 B2
(45) Date of Patent: May 18, 2010

(54) METHOD AND APPARATUS FOR CARRYING OUT CONNECTION AND RELATED INPUT/OUTPUT PROCESSING FUNCTIONS IN A SYNCHRONOUS DIGITAL HIERARCHY TRANSPORT NODE

(75) Inventors: Alberto Bellato, Milan (IT); Silvio Cucchi, Milan (IT); Silvano Frigerio, Como (IT); Alberto Lometti, Lecco (IT); Luca Razzetti, Milan (IT); Stefano Gastaldello, Padua (IT)

(73) Assignee: Alcatel, Paris (FR)

( * ) Notice: Subject to any disclaimer, the term of this patent is extended or adjusted under 35 U.S.C. 154(b) by 890 days.

(21) Appl. No.: 10/710,090

(22) Filed: Jun. 17, 2004

(65) Prior Publication Data

US 2005/0105521 A1    May 19, 2005

(30) Foreign Application Priority Data

Nov. 17, 2003    (EP) .................................. 03292848

(51) Int. Cl.
*H04J 3/00* (2006.01)
(52) U.S. Cl. .................... 370/535; 370/465; 398/45
(58) Field of Classification Search .............. 370/464, 370/465, 489, 532, 535; 716/18, 55–57, 716/43–50
See application file for complete search history.

(56) References Cited

U.S. PATENT DOCUMENTS 7,310,480 B2 * 12/2007 Maciocco et al. ............. 398/48
2004/0105456 A1 * 6/2004 Lanzone et al. ............. 370/429

FOREIGN PATENT DOCUMENTS

EP          0 559 090 A2    9/1993
WO    WO 02/054821 A2    7/2002

OTHER PUBLICATIONS

ITU-T G.783 (Apr. 1997) Series G: Transmission Systems and Media, Digital Systems and Networks—Digital Transmission Systems—Terminal Equipments—Principal characteristics of multiplexing equipment for the synchronous digital hierarchy—Characteristics of synchronous digital hierarchy (SDH) equipment functional blocks.

* cited by examiner

*Primary Examiner*—Ricky Ngo
*Assistant Examiner*—Pao Sinkantarakorn
(74) *Attorney, Agent, or Firm*—Sughrue Mion, PLLC

(57) ABSTRACT

The present invention provides for a method and apparatus for carrying out connection and related input/output processing functions in a Sinchronous Digital Hierarchy (SDH/SONET) transport node (network), in which the payload switching matrices (e.g. MSPC and HPC matrices for an High Order VC system) collapse into one single functional block (MTRX), while the Virtual Container (VCs) monitoring functions (HVC_RX, HVC_TX) are shifted to the Input/Output position of the matrices.

17 Claims, 8 Drawing Sheets

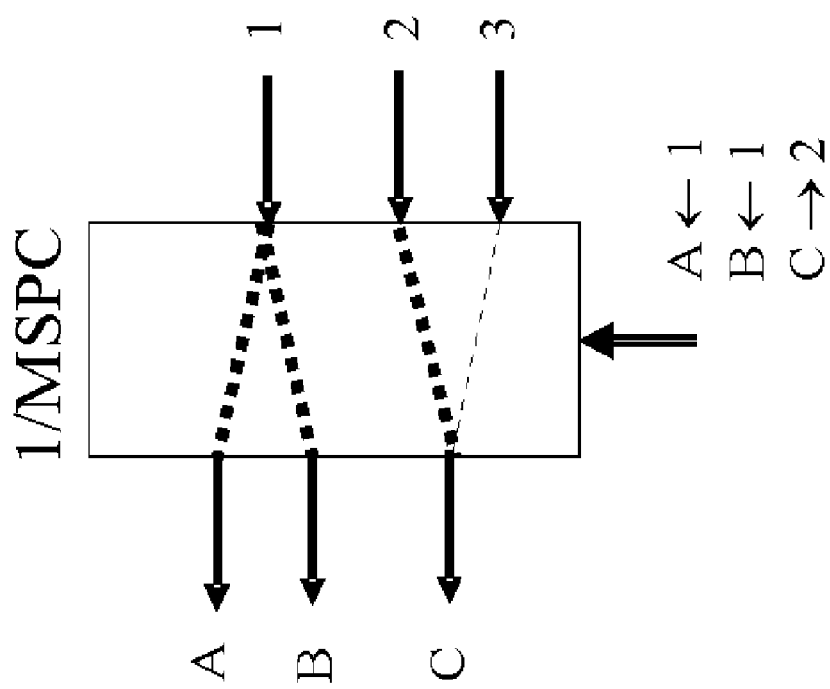
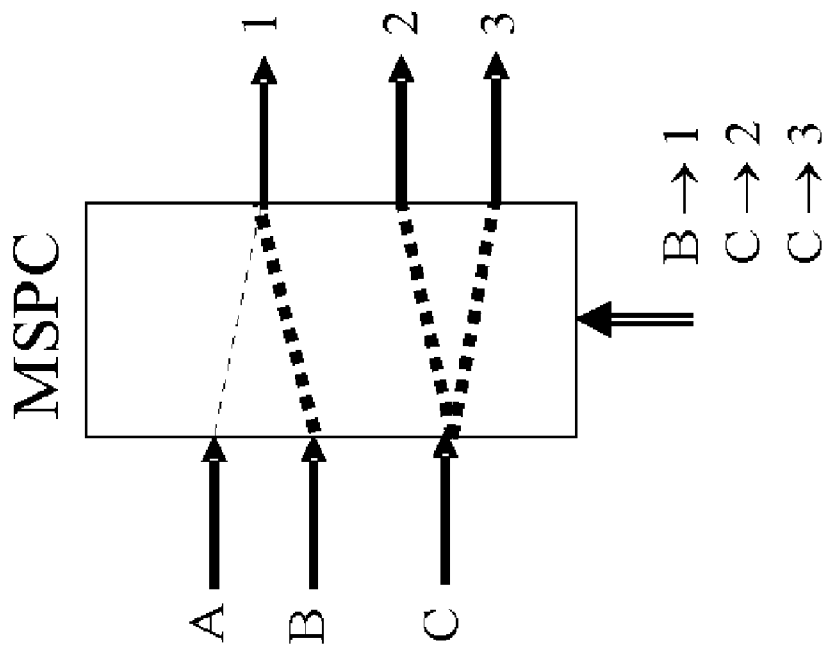
FIG. 6

METHOD AND APPARATUS FOR CARRYING OUT CONNECTION AND RELATED INPUT/OUTPUT PROCESSING FUNCTIONS IN A SYNCHRONOUS DIGITAL HIERARCHY TRANSPORT NODE

This application is based on and claims the benefit of European Patent Application No. 03292848.3 filed on Nov. 17, 2003, which is incorporated by reference herein.

BACKGROUND OF THE INVENTION

1. Field of the Invention

The present invention relates to a method and apparatus for carrying out connection and related input/output processing functions in a Synchronous Digital Hierarchy transport node (network).

2. Description of the Prior Art

In the design of a Synchronous Digital Hierarchy system, i.e. SDH or SONET, a problem is to carry out the correct functional scheme recommended in ITU-T G783 without adding too much complexity like it would happen with a straightforward interpretation of the recommendation.

The Recommendation ITU-T G783 is herewith incorporated by reference.

The key issue is typically the presence in the model of 'connection functions' (matrices) serving different layers (typically in a 4/3/1 system multiplex section layer, higher order path layer and lower order path layer) that in a general implementation should be connected to all the system inputs and outputs.

Other functional blocks, recommended by G783 as well, separate such connection functions, according to the model.

More particularly, the problem is how to connect input and output ports to the various matrices, inserting the correct signal processing and distributing in a suitable way the circuitry on a limited set of boards, without adding too much complexity.

A number of known approaches could be used for solving the above problem.

- A possibility is simply abridging the model, making two or more connection functions collapse in only one and modifying the functional chain accordingly. The drawback of this approach is that some behaviours that are allowed by a strict standard implementation in this case are not possible (typically combination of protection schemes at different layers).
- Another possibility is implementing the different connection functions (matrices) and the entire signal processing among them in (only) one physical board. The main drawbacks in this case are that on one side the system complexity is limited by the amount of circuitry that can be put on a single board, on the other side the cost of the system does not scale nicely with I/O ports but is concentrated in the common parts.
- A third possibility consists in distributing the signal processing relative to functional blocks among matrices in different boards with respect to the connection functions. This implies either a high number of specialized boards (in addition with respect to the 'ideal' simplest architecture barely composed by input/outputs and matrices) or a very complex back-panel design with the signals going back and forward among such boards and the matrices.

SUMMARY OF THE INVENTION

Therefore in view of the known solutions, that are not quite efficient, it is the main object of the present invention to provide a method and apparatus for carrying out connection and related input/output processing functions in a Synchronous Digital Hierarchy (i.e. SDH or SONET) transport node, which is particularly efficient, of low cost implementation and fully compliant with ITU-T G.783.

The basic idea of the invention consists in a modification in the position of G783 blocks in the functional chain in such a way that the 'bulky' signal processing can be concentrated centrated in input/output boards of the system without adding extra complexity to the back-panel. The connection functions collapse into one single block including all the switching matrices.

The negative effects of the misplacement of functional blocks with respect to the standard position is eliminated by a suitable signal pre-processing consisting in evaluating functional parameters on input/output boards (in the 'misplaced' blocks), sending them to 'shadow functional blocks' located in the correct position (typically but not necessarily on a matrix board) with a suitable signaling (in-band or out-of-band) and letting this 'shadow blocks' performing the correct functional operations that cannot be displaced.

These and further objects are achieved by means of an apparatus and method as described in the attached claims, which are considered an integral part of the present description.

BRIEF DESCRIPTION OF THE DRAWINGS

The invention will become fully clear from the following detailed description, given by way of a mere exemplifying and non limiting example, and a variant thereof, to be read with reference to the attached drawing figures, wherein:

FIG. 6 shows an example of operation of 1/MSPC function;

The same reference numerals and letters in the figures designate the same or functionally equivalent elements.

BEST MODE FOR CARRYING OUT THE INVENTION

In the following, and with reference to the drawings, the various functional blocks will be described and depicted with the following meaning, given that in principle the most of them are known per se, at both functional and implementation level, and described in the Recommendation ITU-T G.783.

The following further notations will be used. There will be two directions, respectively TX, transmission, and RX, reception, for the flow of Virtual Containers (VCs) of the transport frames, and two kinds of functions, respectively Sk (Sink), for the path termination functions, and So (Source), for the path generation functions.

MSPC=Multiplex Section Protection Connection Matrix.

HPC=Higher Order Path Connection Matrix.

TTF_Sk, TTF_So=Trail Termination Function, Sink (Sk) or Source (So).

MSA_Sk, MSA_So=Multiplex Section Adaptation function, Sink or Source, based on Higher Order Pointer processing (bytes H1, ... ), interpretation in the Sink part, generation in the Source part. It is to be noticed that according to ITU-T G.783 the MSA function should be included in the TTF function, however in the present context the MSA function is left out of TTF as it has to be processed according to an aspect of the invention.

HVC_RX, HVC_TX=Higher Order Virtual Container termination and monitoring processing function of the POH (Path Over Head) field of the higher order VCs, RX or TX direction. This is the summation of all the functions working on the path level.

HTCM_HTCT_Sk=Higher Order Tandem Connection Monitoring, Higher Order Tandem Connection Termination function, Sink.

HTCT_So=Higher Order Tandem Connection Termination function, Source.

HPOM_HSUT_Sk=Higher Order Path Overhead Monitoring, Higher Order Supervisor Unequipped Termination function, Sink.

HSUT_So=Higher Order Supervisor Unequipped Termination function, Source.

If and to the extent that in the following the above functional blocks are not further described in detail, this means that it is not necessary to give further explanation at both functional and implementation level, as the technician skilled in the art is fully able to implement them, once reading this description and having available all the known art, including the Recommendation ITU-T G.783.

Figure 1:
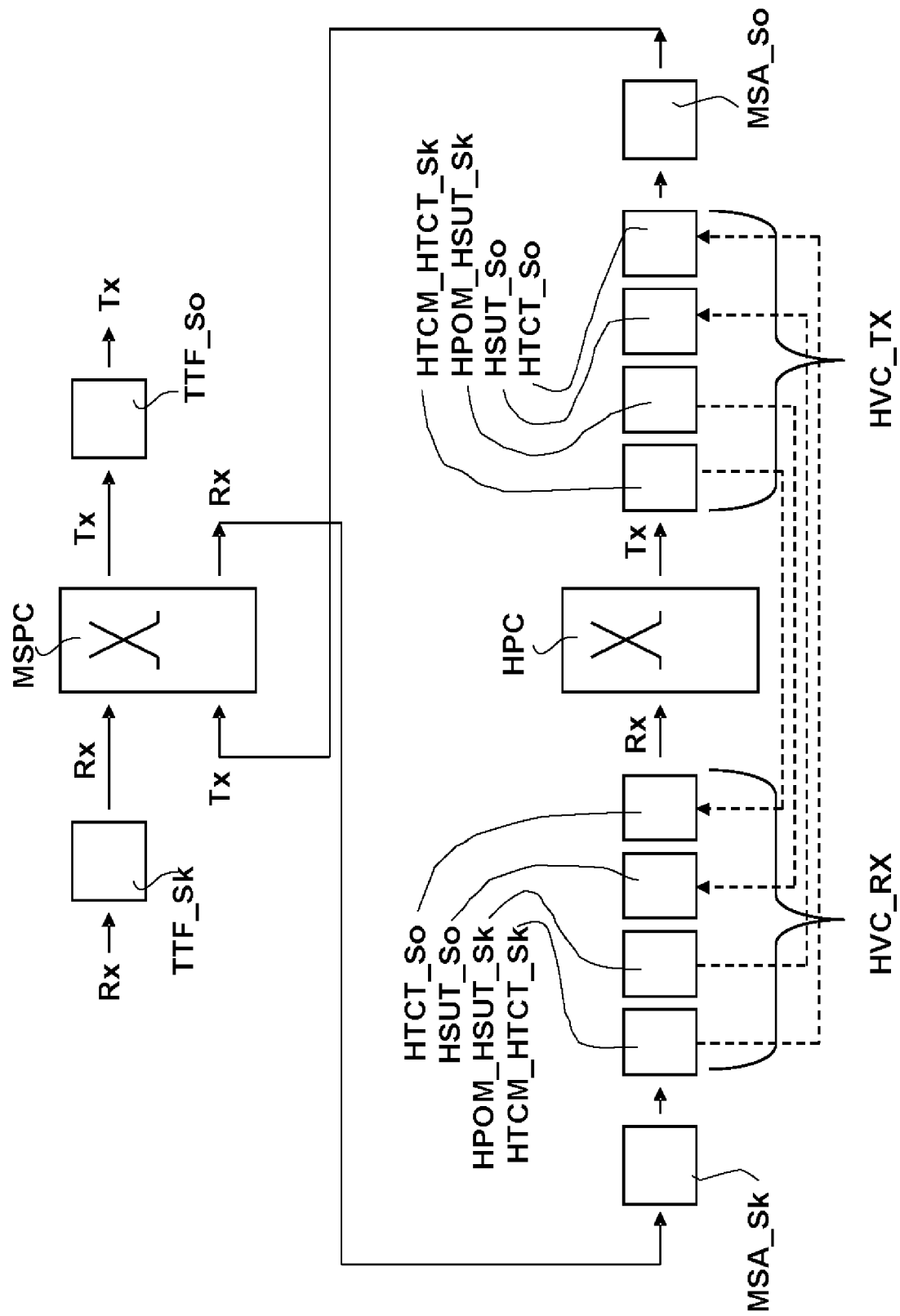
FIG. 1 shows a block diagram of a known system.

A known and straightforward implementation of ITU-T G.783 at system level is shown in FIG. 1.

The flow of Virtual Containers (in the following VCs) of the SDH/SONET frames, coming in the Rx direction through block TTF_Sk, is supplied to the Rx input of Matrix MSPC performing the multiplex section connection function, and then supplied at the Rx output to block MSA_Sk and in turn to the block HVC_RX, performing the functions of blocks HTCM_HTCT_Sk, HPOM_HSUT_Sk, HSUT_So, HTCT_So.

The flow of VCs at the output of HVC_RX is supplied in the Rx direction to the matrix HPC performing the higher order connection function. HPC supplies the output in the Tx direction to the block HVC_TX, performing the functions of blocks HTCM_HTCT_Sk, HPOM_HSUT_Sk, HSUT_So, HTCT_So. The output of HVC_TX is supplied to the block MSA_So, in turn supplying the flow of VCs to the Tx input of matrix MSPC. The latter performs the necessary connection function and supplies the block TTF_So at the Tx output.

The blocks HVC_RX and HVC_TX mutually exchange data, in both Rx and Tx directions, relating to remote criteria (like REI=Remote Error Indication, RDI=Remote Defect Indication, OEI=Outgoing Error Indication, ODI=Outgoing Defect Indication).

In the figure the full lines relate to the payload flow, the dotted lines relate to the remote criteria flow.

Figure 2:
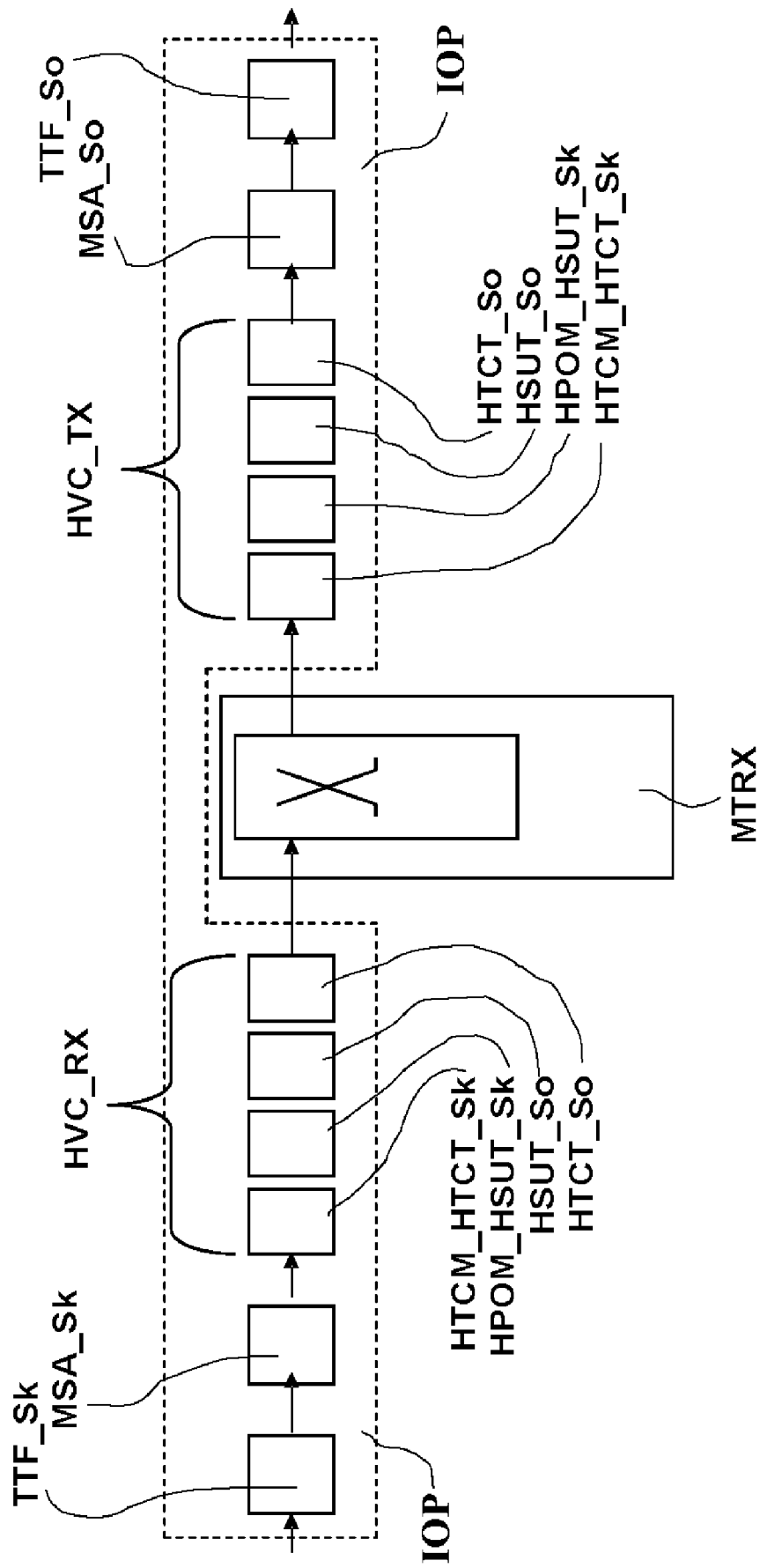
FIG. 2 shows a block diagram of a modified system according to the invention.

As shown in FIG. 2, according to the main aspect of the invention, at both functional and circuit level, SDH/SONET payload switching matrices, foreseen by ITU-T G.783, (e.g. MSPC and HPC matrices for an High Order VC system) collapse into one single block, the matrix card MTRX, while the VC monitoring functions, like Adaptation and Path Termination, MSA_Sk, HVC_RX, HVC_TX in the figure, are shifted to the Input/Output position of the matrices.

This change, however, leads to a violation of the functional model defined in ITU-T G.783, as the adaptation function MSA between multiplex section and path layer and the path layer termination functions HVC are placed before the multiplex section connection matrix MSPC function, and not between MSPC and HPC, as required by ITU-T G.783 and shown in FIG. 1.

More particularly, due to the fact that the Path termination functions are now placed before MSPC connection matrix, the Remote criteria insertion function could fail, and/or a suitable re-provisioning of HVC functions after MSP switch could be needed.

In order to override this issue, the information related to the payload termination/monitoring functions (normally present in the Path Over Head POH of the VCs) is pre-processed and collected by MSA and HVC functions on I/O port card, carried via a dedicated signaling to a central point (the matrix board in the considered example of implementation), where 'shadow' MSPC, MSA and HVC functions reside (see FIG. 3), which process this information in a centralized manner, as better explained below.

The aim of these 'shadow functions' is to correlate, as would (implicitly) happen in a straightforward model implementation, alarm reporting, performance monitoring and remote criteria insertion with the status of the misplaced payload switches (MSPC in the example).

Figure 3:
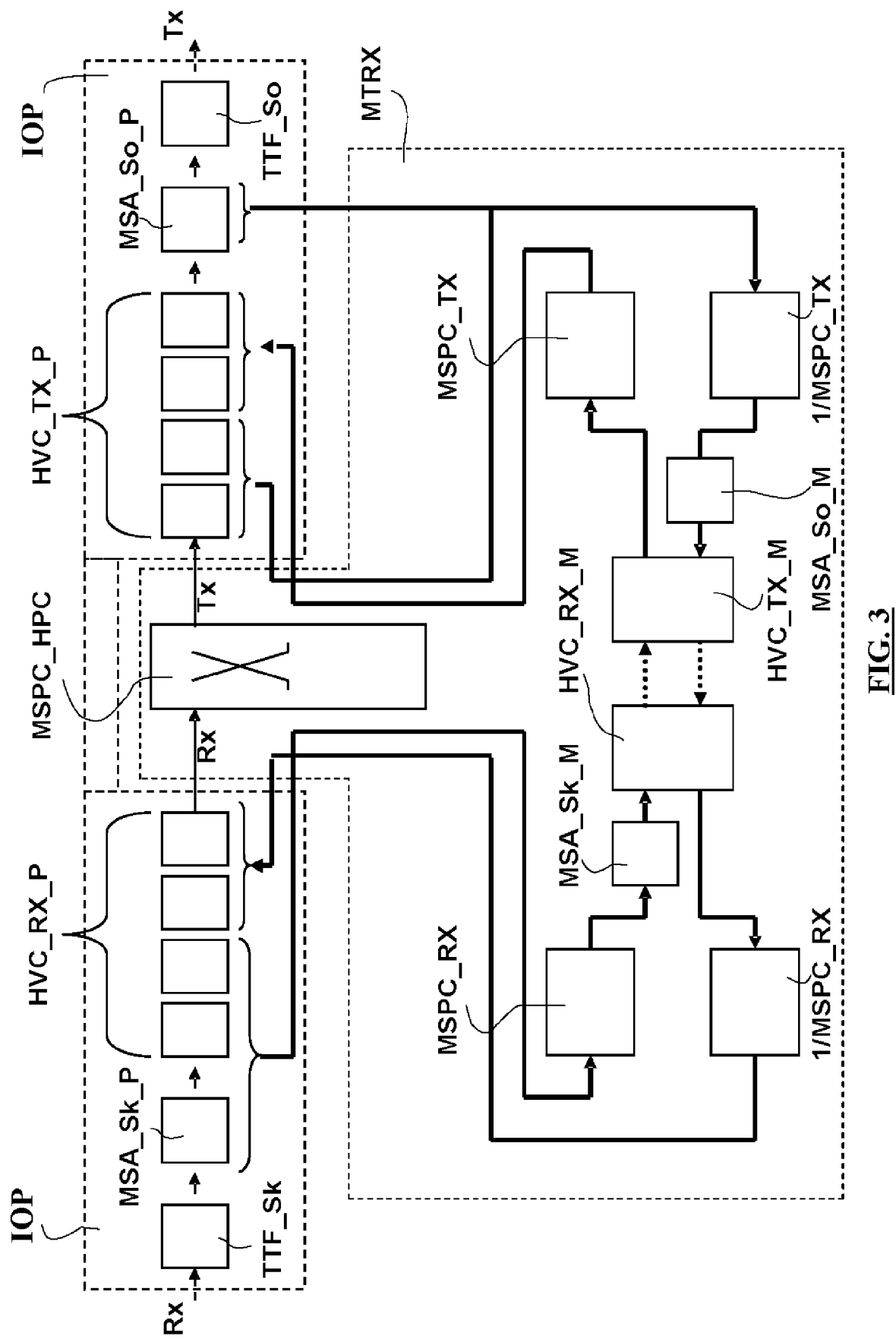
FIG. 3 shows a more detailed block diagram of the system according to the invention.

As shown in FIG. 3, the functional block diagram is divided in two parts: an Input-Output Port IOP and a Matrix Block MTRX.

The Input-Output Port IOP receives the flow of VCs in the Rx direction at the block TTF_Sk and outputs the flow of VCs in the Tx direction from the block TTF_So. At the input and output of IOP the signal flow (sequence of VCs) is the same as in the known structure.

IOP comprises in the Rx direction the following blocks in sequence: TTF_Sk, MSA_Sk_P, HVC_RX_P (performing the functions of blocks HTCM_HTCT_Sk, HPOM_HSUT_Sk, HSUT_So, HTCT_So, Rx side). The Rx output of HVC_RX_P is supplied to the Rx input of the Matrix Block MTRX.

IOP comprises in the Tx direction the following blocks in sequence: HVC_TX_P (performing the functions of blocks HTCM_HTCT_Sk, HPOM_HSUT_Sk, HSUT_So, HTCT_So, Tx side), MSA_So_P and TTF_So. The Tx input of IOP at block HVC_TX_P receives the Tx output of the Matrix Block MTRX.

In IOP the blocks MSA_Sk_P and MSA_So_P, HVC_RX_P and HVC_TX_P perform a part of the functions of blocks MSA_Sk and MSA_So, HVC_RX and HVC_TX of the known structure depicted in FIG. 1, as explained below. The blocks TTF_Sk, TTF_So, of IOP perform the same functions as in the corresponding blocks of the known structure.

The blocks HVC_RX_P and HVC_TX_P perform:

overhead POH pre-processing, physical insertion of remote indications in POH, information collection and sending to the Matrix Block MTRX.

The block MSA_Sk_P performs basically alarm reporting function for alarms like AIS, LOP and sending to the Matrix Block MTRX, while MSA_So_P collects basically pointer justification events. _The sending of the data to the Matrix Block MTRX is made via either in-band or out-of-band signaling. The in-band signaling can be made via existing bytes not used in the frame, like some overhead bytes; the out-of-band signaling can be made via a suitable side connection between the boards IOP and MTRX The Matrix Block MTRX comprises the following blocks:

i) MSPC_HPC: a single block incorporating all the payload switching functions all together; it receives at the Rx input the Rx output of IOP, and supplies the Tx output to the Tx input of IOP. An example of implementation of MSPC_HPC will be described with reference to FIGS. 4 and 5.

ii) The following further 'shadow' functional blocks:

HVC 'virtual image' function (blocks HVC_RX_M and HVC_TX_M): this function performs alarm filtering and reporting, performance monitoring accumulation and remote criteria management, according to the known functions required by ITU-T G.783. The blocks HVC_RX_M and HVC_TX_M physically exchange remote criteria mutually. In addition they exchange in-band or out-of-band signaling with the other blocks. As said above, the real-time functions involving payload processing (both on POH and true VC payload) are performed in the IOP part, like parity check (i.e. byte B3), defects calculation (i.e. TIM, Un-equipped, . . . etc.), and the physical insertion of the remote indications in the POH field is performed in the Input-Output Port IOP by HVC 'physical functions'. The HVC 'virtual image' functions receive these data and perform the remaining filtering and correlation functions for performance monitoring.

MSPC 'virtual image' function (blocks MSPC_RX and MSPC_TX): according to the MSPC switch status, this function conditions the information, carried via in band (or out of band) signaling, collected by physical MSA_Sk and HVC functions located in the Input-Output Port IOP, in 'before matrix' configuration. MSA Sk and HVC 'before matrix' reporting results as if it were performed after the MSPC switch, as foreseen by ITU-T G.783 functional model.

1/MSPC 'virtual image' function (blocks 1/MSPC_RX and 1/MSPC_TX): according to the MSPC switch status, this function conditions the information, carried via in band (or out of band) signaling, collected by physical HVC functions located in the Input-Output Port IOP, in 'after matrix' configuration. HVC 'after matrix' reporting results as if it were performed before the MSPC switch, as foreseen by ITU-T G.783 functional model.

The notation 1/MSPC means that the performed action is the corresponding inverse operation with respect to MSPC, so as to vanish the effect of an MSPC function which has been performed but it shouldn't have been.

So, assuming that the main action performed by the normal MSPC block is a bridge and switch operation, according to the Multiplex Section Protection function, in principle a switch is transformed in a bridge and vice versa by block 1/MSPC.

An example will be described with reference to FIG. 6.

The block MSA_Sk of FIG. 1 is splitted in two parts: the MSA_Sk_P part collects the information and sends it to the block MSPC_RX where it is suitably switched in MSPC_RX and sent to the MSA_Sk_M part where it is processed, according to the known function of Sink Multiplex Section Adaptation, and then supplied to HVC_RX_M.

The block MSA_Sk_P performs basically alarm reporting function for alarms like AIS, LOP, . . . etc. and sending to the Matrix Block MTRX. The block MSA_Sk_M performs the remaining filtering and correlation functions.

MSPC_RX receives in-band (or out of band) signalling data from MSA_Sk_P, HTCM_HTCT_Sk, HPOM_H-SUT_Sk of HVC_RX_P, performs switching operations, and sends results to MSA_Sk_M and to HVC_RX_M. The latter sends in-band (or out of band) signalling data to 1/MSPC-RX, which performs switching operations and sends results to HSUT_So and HTCT_So of HVC_RX_P.

MSPC_TX receives data from HVC_TX_M, performs switching operations, and sends results to HSUT_So and HTCT_So of HVC_TX_P. The block 1/MSPC_TX receives data from MSA_So_P, HTCM_HTCT_Sk, HPOM_H-SUT_Sk of HVC_TX_P, performs switching operations, and sends results to MSA_So_M and to HVC_TX_M.

Figure 4:
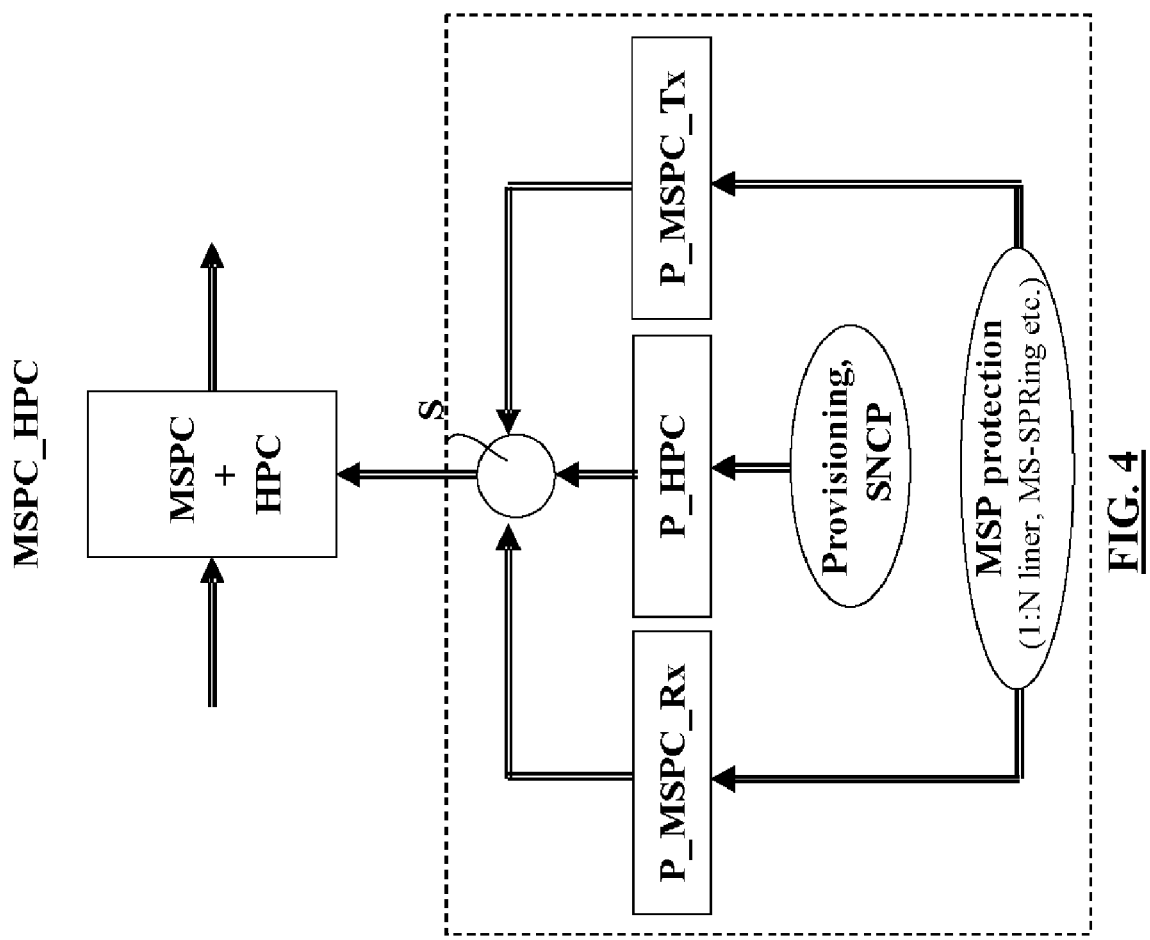
FIGS. 4 and 5 show implementation details of the block MSPC_HPC of FIG. 3.
Figure 5:
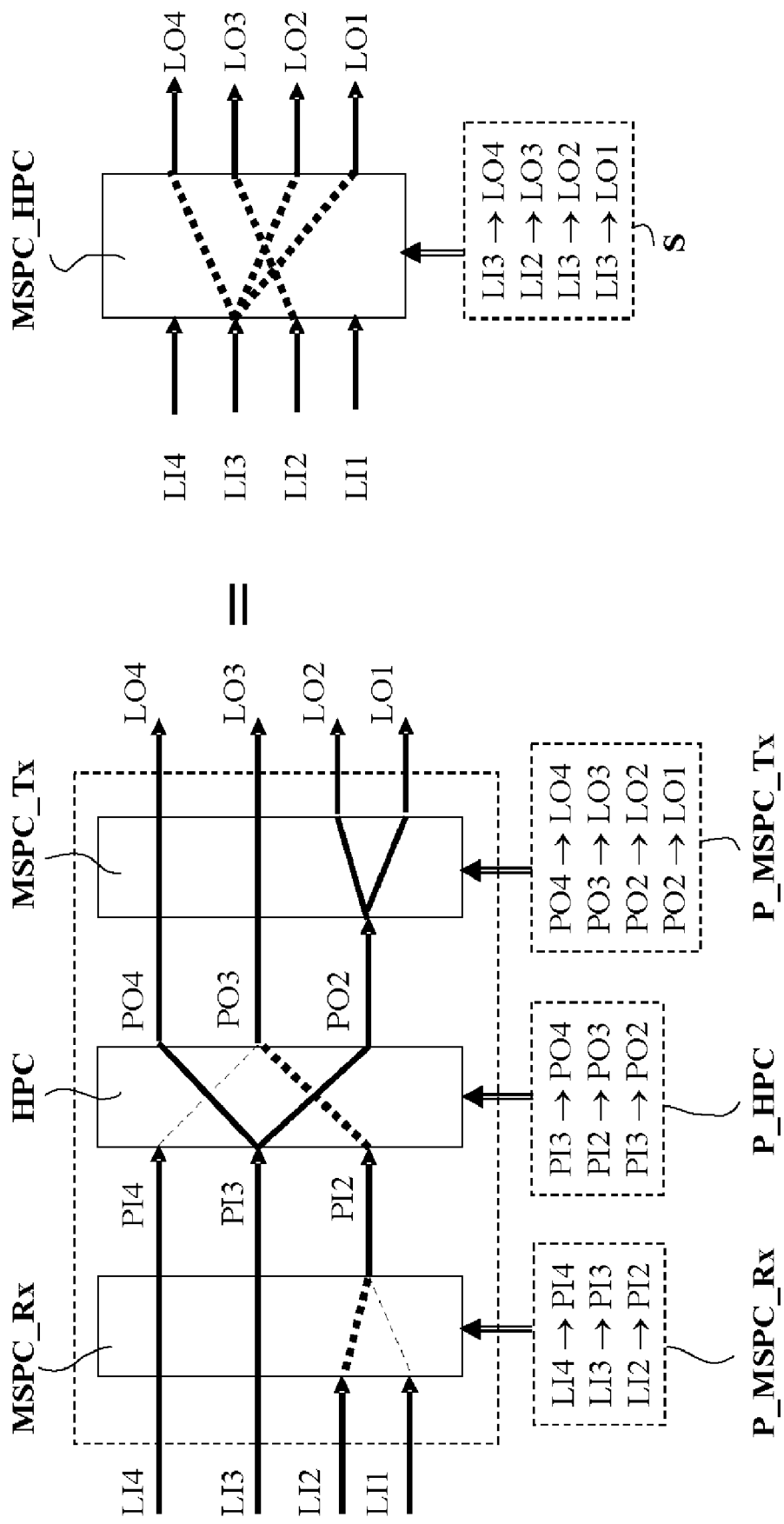

As shown in FIG. 4, the block MSPC_HPC may comprise a pure matrix connection function MSPC+HPC merging the connection functions of MSPC and HPC matrices all together. The unique merged matrix is controlled for the switching by a configuration function S, merging the contributions of programming functions, respectively P_MSPC_Rx, P_HPC and P_MSPC_Tx. The programming functions P_MSPC_Rx and P_MSPC_Tx are the contributions in the Tx and Rx directions respectively, of a general programming function P_MSPC.

P_MSPC_Rx and P_MSPC_Tx are controlled by the outputs of the protection function at MS (Multiplex Section) level, for example MS-SPRING, or 1:N liner, and provide for the MSPC configuration controlling the relating MSPC part of the merged matrix.

P_HPC is controlled by the output of the protection at SNCP (Sub Network Connection Protection) level and the connection Provisioning functions, and provides for the HPC configuration controlling the relating HPC part of the merged matrix.

With reference to FIGS. 5a and 5b, an example of operation of the configuration function S is described. The reported example shows an SNCP protection at VC-4 (SDH) level, performed at the level of P_HPC, nested with an MSP 1+1 protection in the server (MS) layer, performed at the level of P_MSPC.

In FIG. 5a the three blocks MSPC_Rx, HPC and MSPC_Tx show the switching matrices MSPC and HPC under the known configuration, as also depicted in FIG. 1, with the two contributions MSPC_Rx and MSPC_Tx respectively from the Rx and Tx directions of the MSPC matrix. Each matrix receives its own switching control signals, supplied by the respective programming functions of FIG. 4.

As an example, matrix MSPC_Rx has inputs LI1, LI2, LI3, LI4, and outputs PI2, PI3, PI4; matrix HPC has inputs PI2, PI3, PI4 (corresponding with the outputs of MSPC_Rx), and outputs PO2, PO3, PO4; matrix MSPC_Tx has inputs PO2, PO3, PO4 (corresponding with the outputs of HPC), and outputs LO1, LO2, LO3, LO4.

In the particular situation here described, for matrix MSPC_Rx, inputs LI1 and LI2 are subject to switching selection under protection of the MS level, with the result that input LI2 will be connected to output PI2, and input LI1 will not be connected to the output. Input LI3 is directly connected with output PI3, and LI4 with PI4, as not protected at the MS level. For matrix HPC, inputs PI2 and PI4 are subject to switching selection under protection of the SNCP level, with the result that input PI2 will be connected to output PO3, and input PI4 will not be connected to the output. Input PI3 is bridged to the outputs PO2 and PO4, with the result that input PI3 is connected to both outputs PO2 and PO4. For matrix MSPC_Tx, inputs PO3 and PO4 are directly connected with respective outputs LO3 and LO4, as not protected at the MSP level. Input PO2 is bridged to the outputs LO1, LO2, with the result that input PO2 is connected to both outputs LO1 and LO2.

FIG. 5b shows the same configuration under the new situation of merged matrix MSPC_HPC. What must be obtained with the configuration function S is the same switching correspondence between inputs LI1, . . . LI4 and outputs LO1, . . . LO4 of the global matrix of FIG. 5a, namely LI1 is not connected with the output, LI2 is connected to LO3, LI3 is connected to LO2 and LO4.

So the general operation of the configuration function S is that of merging the three contributions coming from the programming functions P_MSPC_Rx, P_HPC and P_MSPC_Tx into one only for the switching control of the merged matrix MSPC_HPC.

With reference to FIG. 6, an example of operation of the 1/MSPC function is described.

Due to the shift to the I/O position of the input-output functions, as described above, MS protection operations have occured in 'after matrix' configuration. In the example of FIG. 6, in the block MSPC there are inputs A, B, and C, and outputs 1, 2 and 3. Inputs A and B are subject to switching selection, with the result that input B will be connected to output 1, and input A will not be connected to the output. Input C is bridged to the outputs 2 and 3, with the result that input C is connected to both outputs 2 and 3.

Therefore the block 1/MSPC performs the opposite operation, on inverted inputs and outputs with respect to MSPC, namely a bridge between input 1 and outputs A and B, and a switch between inputs 2 and 3 and output C. This way the original situation of signals A, B, C, 1, 2 and 3 is recovered. The physical operation is performed by the blocks 1/MSPC—TX and 1/MSPC—RX of FIG. 3.

The global behaviour of the system according to the invention, seen at the system external interfaces, is functionally equivalent to the known scheme shown in FIG. 1, and fully compliant with the ITU-T G.783 requirements.

Further implementation details will not be described, as the man skilled in the art is able to carry out the invention starting from the teaching of the above description.

There has thus been shown and described a novel method and a novel apparatus for carrying out connection and related input/output processing functions in a Synchronous Digital Hierarchy transport node (network), which fulfills all the objects and advantages sought therefor. Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

In a variant embodiment, the invention can also be applied when the connection function extends to the Lower Order Path Connection Matrix LPC and relating input/output processing functions. The lower order relates to Virtual Containers VC12, . . . for SDH, and VT1.5 . . . for SONET With reference to the drawings, the known system of FIG. 1 is modified as shown in FIG. 7, and the system of FIG. 2 according to the invention is modified as shown in FIG. 8.

Figure 7:
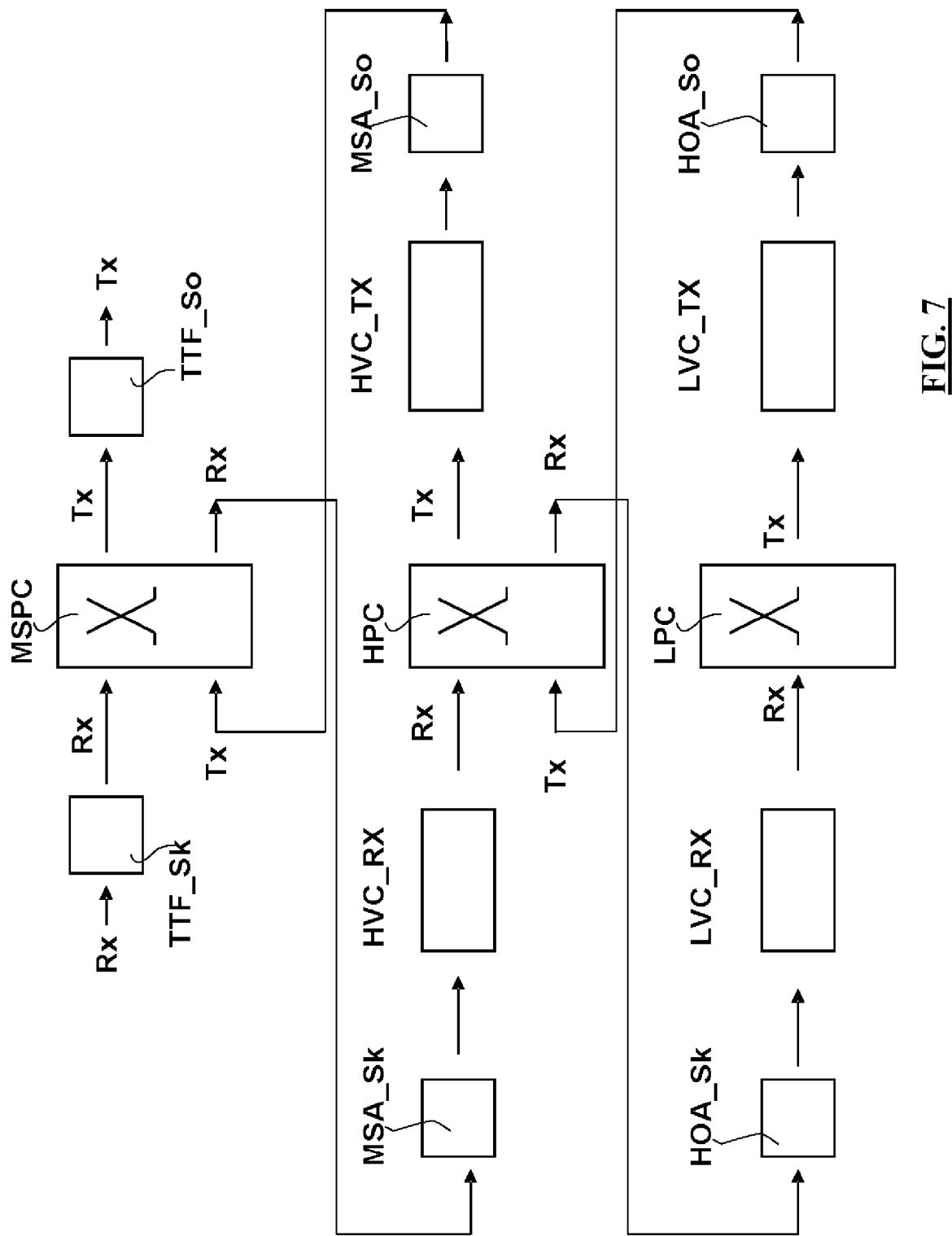
FIG. 7 shows a block diagram of a variant of the known system FIG. 1.
Figure 8:
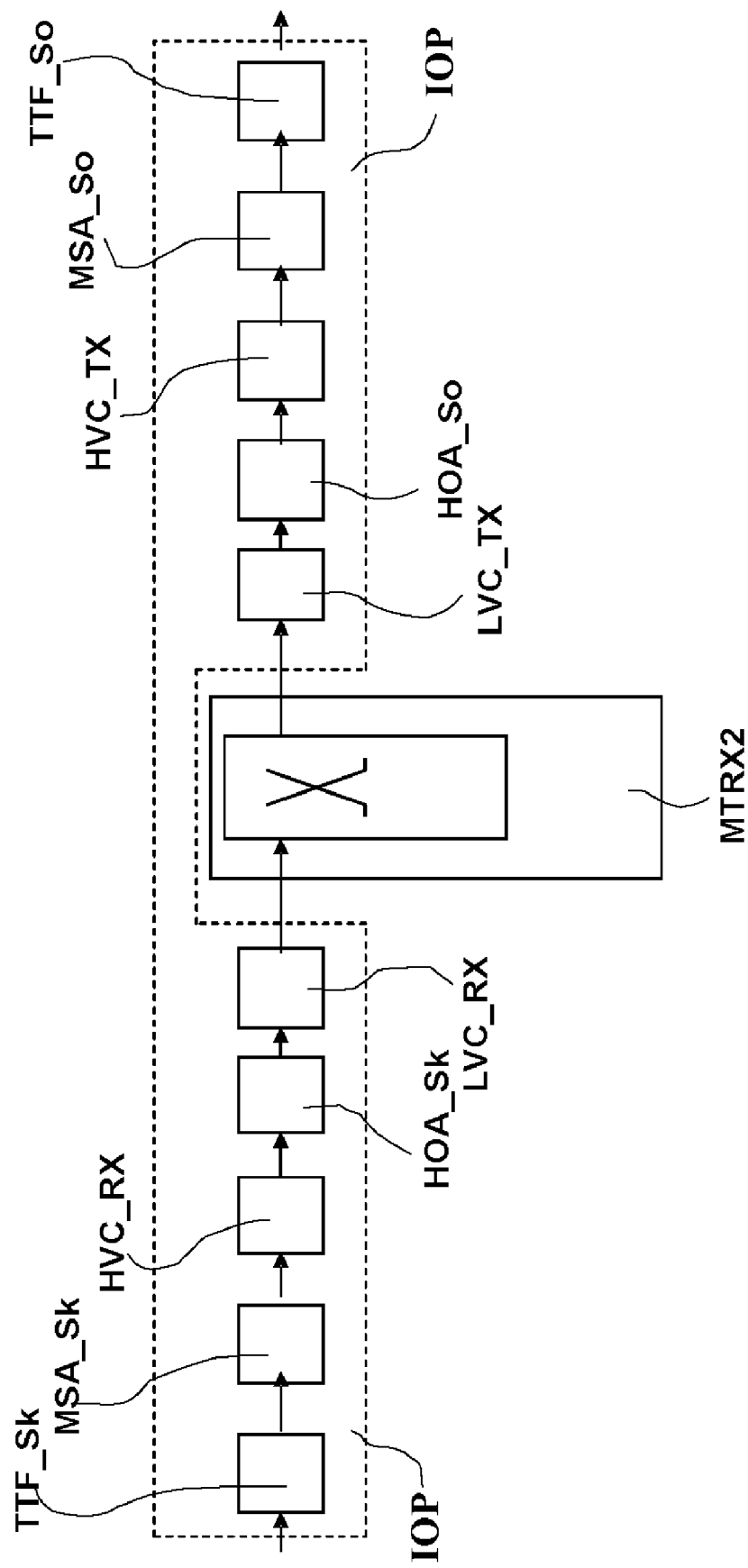
FIG. 8 shows a block diagram of a variant of the modified system of FIG. 2.

As shown in FIG. 7, the known architecture of FIG. 1 is extended by adding a further layer comprising the Lower Order Path Connection Matrix LPC, as defined in ITU-T G.783, and relating input/output processing functions, namely:

HOA_Sk, HOA_So: Higher Order Assembler function, Sink or Source, that comprises as a compound function the basic functions: Higher Path Adaptation function (HPA), Sink or Source, based on Lower Order Pointer processing, interpretation in the Sink part, generation in the Source part, and Higher Order Path Termination function (HPT), Sink or Source.

LVC_RX, LVC_TX=Lower Order Virtual Container termination and monitoring processing function of the POH (Path Over Head) field of the lower order VCs, RX or TX direction. This is the summation of all the functions working on the path level.

As for the Higher Order level, LVC_RX and LVC_TX comprise the following sub-functions (not shown):

LTCM_LTCT_Sk=Lower Order Tandem Connection Monitoring, Lower Order Tandem Connection Termination function, Sink.

LTCT_So=Lower Order Tandem Connection Termination function, Source.

LPOM_LSUT_Sk=Lower Order Path Overhead Monitoring, Lower Order Supervisor Unequipped Termination function, Sink.

LSUT_So=Lower Order Supervisor Unequipped Termination function, Source.

As a difference with respect to FIG. 1, the flow of Lower Order Virtual Containers (like VC12 for SDH) coming in the Rx direction from block HVC_RX, is supplied to the Rx output of the matrix HPC, and then at the Rx input of block HOA_Sk and in turn to the block LVC_RX, performing the functions of blocks LTCM_LTCT_Sk, LPOM_LSUT_Sk, LSUT_So, LTCT_So.

The flow of VCs at the output of LVC_RX is supplied in the Rx direction to the matrix LPC performing the lower order connection function. LPC supplies the output in the Tx direction to the block LVC_TX, performing the functions of blocks LTCM_LTCT_Sk, LPOM_LSUT_Sk, LSUT_So, LTCT_So. The output of LVC_TX is supplied to the block HOA_So, in turn supplying the flow of VCs to the Tx input of matrix HPC. The latter performs the necessary connection function and supplies the block HVC_TX at the Tx output.

As a difference with respect to FIG. 2, in FIG. 8, according to the invention, at both functional and circuit level, SDH/SONET payload switching matrices MSPC, HPC and LPC, foreseen by ITU-T G.783, collapse into one single block, the matrix card MTRX2.

The VC monitoring functions, basically Adaptation and Path Termination, are shifted to the Input/Output position of the matrix MTRX2. A series configuration is implemented, namely a cascade of TTF_Sk, MSA_Sk, HVC_RX, HOA_Sk, LVC_RX in 'before matrix' configuration, and LVC_TX, HOA_So, HVC_TX, MSA_So, TTF_So in 'after matrix' configuration.

For this variant, the circuit implementation follows the basic schematics shown in FIG. 3 for the Higher Order case, and therefore it is not necessary to describe it in details, as the skilled man is able to carry out the relating implementation without inventive activity.

By means of the present invention, a number of advantages are achieved.

The new solution allows for a fully compliant implementation of the G783 functional model, without any of the disadvantages outlined describing the prior art, in particular:

there are no functional limitations in combining protection schemes at different layers;

the major system complexity is left in input/output boards in such a way that the system cost scales nicely with the supported number of input/outputs, moreover the different connection functions can be collapsed in (only) one without negative consequences, thus easing up the design and significantly saving circuitry;

no extra boards are needed besides input/outputs and matrices and the backpanel complexity is kept to a minimum.

The invention claimed is:

1. A method for carrying out connection and related input/output processing functions in a Synchronous Digital Hierarchy (SDH) transport node, the method comprising:

performing payload connection functions in one single collapsed connection function; and performing input/output processing functions at input/output positions of the one single collapsed connection function, wherein the payload connection functions comprise switching a SDH payload at a multiplex section layer and a higher order path layer, and wherein the input/output processing functions comprise:
adaptation of the SDH payload between the multiplex section layer and the higher order path layer based on higher order pointer processing;
termination and monitoring of path overhead at the higher order path layer;
pre-processing overhead bytes at the higher order path layer;
collecting information related to the input/output processing functions including information on the pre-processed overhead bytes;
carrying the collected information to a central shadow point via dedicated signaling; and
shadow-processing the pre-processed and collected information in a centralized manner in the central shadow point, and transmitting the shadow-processed information as input to the payload connection functions so that the shadow processed information is used to configure the switching the SDH payload at the multiplex section layer and the higher order path layer, and wherein the shadow-processing is performed such that the adaptation and the termination appear to be performed after switching the SDH payload at the multiplex section layer and before switching the SDH payload at the higher order path layer.

2. The method according to claim 1, wherein the payload connection functions further comprise switching the SDH payload at a lower order path layer, and wherein the input/output processing functions further comprise assembling the SDH payload at the higher order path layer, and termination and monitoring of the SDH payload at the lower order path layer.

3. The method according to claim 1, wherein the pre-processing and the collecting the information comprises: bi-directionally pre-processing and collecting the information respectively in a reception side in a before-matrix position and in a transmission side in an after-matrix position, with respect to a matrix for the payload connection functions, wherein the shadow-processing is performed such that in the reception side, the collected information results as if the adaptation and the termination were performed in an after-matrix position with respect to a matrix for switching the SDH payload at the multiplex section layer, and in the transmission side, the collected information results as if the adaptation and the termination were performed in a before-matrix position with respect to the matrix for the switching the SDH payload at the multiplex section layer; and wherein the collected information is subject to, in the central shadow point, for the adaptation, filtering and correlation functions, for the termination at the higher order path layer and monitoring, alarm filtering and reporting, performance monitoring accumulation and remote criteria management.

4. The method according to claim 1, wherein the one single collapsed connection function performs the following functions:

a pure payload matrix connection function merging the switching the SDH payload at the multiplex section and the switching the SDH payload at the higher order path connection function together;

a first programming function, controlled by an output of a protection function at a multiplex section (MS) level, configuring the switching the SDH payload at the multiplex section;

a second programming function, controlled by an output of a protection at a sub-network connection protection (SNCP) level function and a connection provisioning function, configuring the switching the SDH payload at the higher order path layer; and a configuration function merging contributions of the first and the second programming functions, for controlling operations of the pure matrix connection function.

5. The method according to claim 1, wherein the collected information is carried to the central shadow point via dedicated in-band or out-of-band signaling.

6. The method according to claim 1, wherein the shadow-processing comprises:

switching the collected information to generate a result, and processing the result; and performing an inverse operations of the switching the collected information.

7. The method according to claim 6, wherein the processing the result comprises performing alarm filtering and reporting, performance monitoring and remote criteria management with respect to misplaced payload connection as defined in International Telecommunication Union (ITU)-T Recommendation G.783, and wherein the pre-processing adaptation comprises alarm reporting, and the pre-processing termination comprises path overhead pre-processing and physical insertion of remote indications in the path overhead.

8. The method according to claim 1, wherein the adaptation comprises multiplex section adaptation based on higher order pointer processing that provides mapping and demapping higher order virtual containers with a frame at the multiplex section layer.

9. An apparatus for carrying out connection and related input/output processing functions in a Synchronous Digital Hierarchy (SDH) transport node, the apparatus comprising:

a single collapsed connection matrix switching a SDH payload at a multiplex section layer and a higher order path layer; and an input/output board, placed in an input/output positions with respect to the single collapsed connection matrix, and performing input/output processing functions of the single collapsed connection matrix, wherein the single collapsed connection matrix comprises a multiplex section connection matrix and a higher order path connection matrix directly interrelated, the multiplex section connection matrix switching the SDH payload at a multiplex section layer, and the higher order path connection matrix switching the SDH payload at a higher order path layer, and wherein the input/output board comprises:

means for performing adaptation of the SDH payload between the multiplex section layer and the higher order path layer based on higher order pointer processing, and termination and monitoring path overhead at the higher order path layer;

means for pre-processing overhead bytes at the higher order path layer;

means for collecting information related to the input/output processing functions including information on the pre-processed overhead bytes;

means for carrying the collected information to central shadow circuits via dedicated signaling; and means for shadow-processing the collected information in a centralized manner in the central shadow circuits, and transmitting the shadow-processed information to the single collapsed connection matrix so that the shadow-processed information is used to configure the switching the SDH payload at the multiplex section layer and the higher order path layer, wherein the shadow-processing is performed such that the adaptation and the termination appear to be performed after switching the SDH payload at the multiplex section layer and before switching the SDH payload at the higher order path layer.

10. The apparatus according to claim 9, wherein the single collapsed connection matrix farther comprises a lower order path connection matrix directly interrelated to the multiplex connection matrix and the higher order path connection matrix, the lower order path connection matrix switching the SDH payload at a lower order path layer, and wherein the input/output board farther comprises means for assembling the SDH payload at the higher order path layer, and terminating and monitoring the SDH payload at the lower order path layer.

11. The apparatus according to claim 9, wherein the central shadow circuits bidirectionally receives and transmits the collected information from/to a receiver and a transmitter, and comprises:

shadow connection circuits performing the shadow processing on the collected information such that in a side of the receiving, the collected information results as if the adaptation and the termination were performed in an after-matrix position with respect to a matrix for switching the SDH payload at the multiplex section layer, and in a side of the transmitting, the information results as if the input/output processing function were performed in a before-matrix position with respect to the matrix for the switching the SDH payload at the multiplex section layer, wherein the shadow connection circuits comprises shadow connection reception circuits bidirectionally connected to the receiver, and shadow connection transmission circuits bidirectionally connected to the transmitter;

first shadow circuits for performing filtering and correlation functions for the adaptation; and second shadow circuits for performing alarm filtering and reporting, performance monitoring accumulation and remote criteria management for the termination and monitoring of the SDH payload at the higher order path layer, the first and second shadow circuits being placed in between the shadow connection reception and transmission circuits.

12. The apparatus according to claim 11, wherein the collected information is carried to the central shadow circuits via dedicated in-band or out-of-band signaling circuits.

13. The apparatus according to claim 9, wherein the one single collapsed connection matrix comprises:

a pure payload matrix connection circuit merging the switching the SDH payload at the multiplex section and the switching the SDH payload at the higher order path connection function together;

first programming circuits, controlled by an output of a protection function at a multiplex section (MS) level, configuring the switching the SDH payload at the multiplex section;

second programming circuits, controlled by an output of a protection at a sub-network connection protection (SNCP) level function and a connection provisioning function, configuring the switching the SDH payload at the higher order path layer;

a configuration circuit receiving and merging contributions of the first and the second programming circuits, and supplying control signals for operations of the pure matrix connection circuit.

14. A node of a Synchronous Digital Hierarchy transport network, comprising an apparatus for carrying out connection and related input/output processing functions as in claim 9.

15. The apparatus according to claim 9, wherein the shadow-processing comprises:

switching the collected information to generate a result, and processing the result; and performing an inverse operations of the switching the collected information.

16. The apparatus of claim 15, wherein the processing the result comprises performing alarm filtering and reporting, performance monitoring and remote criteria management with respect to misplaced payload connection as defined in International Telecommunication Union (ITU)-T Recommendation G.783, and wherein the pre-processing adaptation comprises alarm reporting, and the pre-processing termination comprises path overhead pre-processing and physical insertion of remote indications in the path overhead.

17. The apparatus according to claim 9, wherein the adaptation comprises multiplex section adaptation based on higher order pointer processing that provides mapping and demapping higher order virtual containers with a frame at the multiplex section layer.

* * * * *